United States Patent
Pate

(10) Patent No.: US 6,214,490 B1
(45) Date of Patent: Apr. 10, 2001

(54) FOAM COLLECTOR FOR ELECTROCHEMICAL CELLS

(75) Inventor: Paul Pate, Branford, FL (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 09/215,839

(22) Filed: Dec. 17, 1998

(51) Int. Cl.$^7$ .................. H01M 4/80; H01M 10/36
(52) U.S. Cl. .................. 429/94; 429/235; 429/245
(58) Field of Search .................. 429/94, 245, 235

(56) References Cited

U.S. PATENT DOCUMENTS

| | | | |
|---|---|---|---|
| 4,251,603 | * | 2/1981 | Matsumoto et al. .................. 429/94 |
| 5,733,684 | * | 3/1998 | Harada et al. .................. 429/245 X |

FOREIGN PATENT DOCUMENTS

| | | | |
|---|---|---|---|
| 0878855 | 11/1998 | (EP) | .................. H01M/2/26 |
| 58-080265 | 5/1983 | (JP) | .................. H01M/2/20 |
| 58-119154 | 7/1983 | (JP) | .................. H01M/2/20 |
| 9718594 | 5/1997 | (WO) | .................. H01M/2/22 |

* cited by examiner

Primary Examiner—John S. Maples
(74) Attorney, Agent, or Firm—Linda Gebauer; Robert W. Welsh

(57) ABSTRACT

An improved current collector for electrochemical cells is formed of a conductive porous foam. The foam is preferably a nickel foam as is often used as an electrochemical cell substrate. The high porosity foam's compressibility and resiliency provide an adaptive contact surface which accommodates variations in the shape and position of electrodes and other circuit elements. By using this material as an improved current collector, electrochemical cells are more easily produced with reduced internal resistance. Improved methods of assembly are a result of the nature of the high porosity foam material and its compliance. The foam collector may be used as a pressure connection or welded to the spiral edge of jelly-roll electrode assemblies. To increase effective contact area and also improve resistance to vibration forces, portions of the collector are compressed in a radial space between a jelly-roll assembly and the surrounding container. Foam current collectors according to the invention also have a low profile increasing the productive volume of the cell. The foam collector may be connected to the spiral edge of negative or positive electrodes of standard jelly-roll configuration cells. The advantages of reduced resistance is particularly beneficial to high drain rate cells such as nickel-metal hydride cells.

8 Claims, 3 Drawing Sheets

FOAM COLLECTOR FOR ELECTROCHEMICAL CELLS

BACKGROUND OF THE INVENTION

The present invention pertains to electrochemical cells and the collection of electrical current produced by electrodes. In particular the invention is an electrochemical cell and current collector providing an improved electrical connection between electrodes and cell terminals.

In electrochemical cells it is necessary to collect the electrical current produced in the electrodes and deliver it to the cell terminals where it can be directed to external use. Cells include circuitry between the electrodes and the terminals for this purpose. Particularly in cells having a high discharge rate, the effectiveness of this circuitry is important to performance. A critical element of this circuitry is a current collector that collects the current produced over the entire area of the electrode. The current collector must then deliver the current to other circuit elements or a cell terminal. The effectiveness of the current collector is exhibited by low internal resistance. Where current collection is not effectively performed, the cell will generally exhibit higher resistance to current passage, reduced discharge rates and reduced output voltage. Higher operating temperatures are also a possible consequence.

Many electrochemical cells, particularly secondary cells such as nickel-cadmium and nickel-metal hydride cells, employ discrete electrodes that are each formed of a thin conductive substrate on which an electrochemically active material is deposited. Because the effective volume of the active material is dispersed over the relatively large area of the substrate, collection of generated current from the entire substrate is problematic. This problem may be increased by the manner in which the electrodes are shaped or stacked to fit within the cell container. In what is known as a "jelly-roll" configuration, positive and negative electrodes are wound in a spiral fashion for insertion into a round container. One form of a current collector used on electrodes in jelly-roll assemblies, as well as other cells, is a small collector tab welded or otherwise attached to the edge of the electrode substrate. These tabs are small with respect to the electrode substrate and contact the electrode at a single discrete location. Consequently, the current path for much of the electrode to this collector is relatively long resulting in high resistance. A conductive strap is typically used to connect the tab to the cell terminal. Fabrication problems also exist with these edge-welded tabs; welding of the tabs is burdensome for high volume production. As well, post-assembly welding of the straps to the cell container or terminal is also difficult.

These problems are somewhat addressed for jelly-roll cell assemblies by using collectors which attempt a pressure contact on the entire coiled edge of the electrodes at the end of the jelly-roll. By winding the electrodes with one electrode axially offset from the other, each end of the jelly-roll assembly presents a single spiral electrode edge. One spiral edge (generally the negative electrode) is located adjacent the bottom of the cell container and the other (generally the positive) adjacent the top. A current collector is then placed between the end of the container and the respective electrode spiral edge. The current collector is configured to contact the spiral electrode edge at a multitude of points increasing the effective current path area. A version of this current collector is presented in U.S. Pat. No. 4,529,675 to Sugalski. The Sugalski collector introduces resilient deflected tabs biased to maintain contact with the electrode edge. However, contact with the electrode is limited in this construction to the edges of the tabs. In addition, because the tabs' edges present a rigid edge and are preset in shape and orientation they are unable to accommodate, or adjust to, possible variations in offset or shape of the spiraled edge. Although the tabs are resilient, their contacting edges are rigid with respect to the electrode edge and therefore cannot adjust to variations in electrode height. The inability to adjust to variations in shape is shared by all current collectors which are locally rigid.

In delivering the collected current to the cell container or terminal, current collectors such as that presented in the Sugalski patent also suffer from their inherent rigidity. Collectors that incorporate an effectively rigid body, such as the base portion of Sugalski's collector, generally do not make effective pressure contact against flat surfaces such as the bottom of a cell container. Because of the rigidity of the structures, contact at a small number of points usually results. To prevent high resistance to current flow a welded connection to the container is often necessary.

An additional disadvantage of the Sugalski device and similar devices is the relatively large volume of the cell container required for their use. Commercial cell dimensions are typically fixed by industry standard configurations. For a particular configuration, maximizing capacity requires minimizing the space or volume taken up by non-active elements such as current collectors. To minimize non-active volume, an optimum current collector will have as short or low a profile as possible. What is needed is an improved current collector that enables a low resistance connection to electrodes by establishing contact on a maximum area of the electrode. The same electrode should provide a low resistance connection to the cell container, be easy to assemble, and have a low profile.

SUMMARY OF THE INVENTION

An object of the present invention is an improved low profile and low resistance current collector formed of a metallic foam.

A second object of the present invention is a current collector formed of a thin sheet of conductive foam having a locally compressible contact surface that can accommodate variations in electrode edge shape.

Another object of the present invention is an electrochemical cell having a compressible current collector forming a conductive connection between the edge of a jelly-roll assembly electrode and the electrode cell container.

Yet another object of the present invention is a foam metal collector having ear portions captured between a spiral wound electrode assembly and the associated container sidewalls to increase contact surface and increase protection against vibration.

Yet a further object of the present invention is a simplified method of assembling electrochemical cells in which a conductive foam collector is introduced between an electrode and a cell container to form an electrical connection.

The objects of the present invention are the result of the novel concept of using a conductive material both generally and locally compressible to form a highly adaptive circuit element in an electrochemical cell. These properties in a current collector enable the collector to adjust, during assembly, to variations in dimension and position of the electrodes and containers of cells. Preferably, the collector of the present invention is formed of a nickel foam material. This material comprises a three-dimensional matrix of filaments or walls having relatively small cross section. The small cross section of the solid elements allows the matrix to be easily compressed. Nickel foams also provide sufficient resiliency such that an expansive force is retained after compression. Typical foam materials are provided in the industry today. A preferred material has a 92 to 94 percent porosity. Alternative materials such as nickel plated copper foam may also be used. In an electrochemical cell, the foam material is introduced between an electrode and a circuit element or cell terminal. In a cell having electrodes fabricated in a jelly-roll configuration, the foam material is in the shape of a thin sheet sized to contact the spiral edge of an electrode. This foam collector is compressed between the bottom of cell container and jelly-roll in a pressure contact. The local compressibility of the foam allows for full contact of the spiral portion of the perimeter edge of the wound electrode. In one embodiment, the foam collector includes ear portions that are compressed, during assembly, between the jelly-roll and the container side walls. The ear portions provide an increased electrical contact area and, due to friction, assist in preventing vibration induced movement of the electrodes. The foam collector may also connect between the jelly-roll electrode and a circuit element distinct from the cell container. This is likely where the cell container is nonconductive. In alternative embodiments, a foam collector is welded to the spiral edge and/or to the cell container. Fused regions within the foam collector result. The foam collector may also be used at the top of a jelly-roll electrode assembly, as a collector for what is typically the positive electrode of the cell. A circuit element such as a conductive strap connects the foam collector in this position with a cell terminal.

The present foam collector simplifies the assembly of electrochemical cells. In methods of the present invention, cells are formed by introducing a piece of foam material as a collector between the electrode and cell during assembly and by compressing or crushing the foam material sufficiently to produce an effective pressure contact. Because the foam collector is appreciably compressed during assembly, it accommodates variations—both between cells and within a particular cell component—in shape and dimension. Alternatively, the foam collector may be welded to the container or electrode before assembly. Methods are also provided for welding the foam collector to the conductive container after insertion of the electrodes into the container. As well as jelly-roll configurations, the foam collector is incorporated in cells having other constructions, such as prismatic cells having many individual sheet electrodes.

Because the foam collector is easily assembled into a cell, costs can be reduced. The number of parts rejected due to internal open circuits or unacceptable resistance is reduced. The foam collector parts cost is also less than most fabricated collectors. An additional advantage is its inherent low profile. A preferred thickness of a nickel foam collector for use in a Cs (sub C) cell is about 0.050 inch (1.27 mm). This is compressed to a final thickness of about 0.020 inch (0.51 mm). A reduced thickness allows more of the cell volume to be used by energy storing elements—increasing potential energy density and capacity of the cell. The present novel foam collector, electrochemical cells using foam collectors, and methods of assembly using foam collectors provide advantages over previous devices and methods. The particular features and uses of the present invention are best understood with respect to the following detailed description.

DESCRIPTION OF THE PREFERRED EMBODIMENTS

Figure 1:
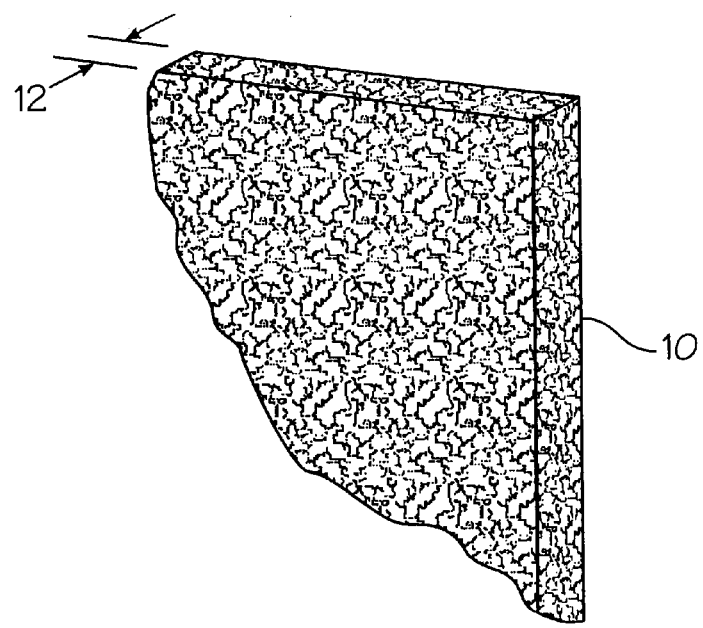
FIG. 1 depicts a foam material according to the present invention.

A current collector according to the present invention is preferably fabricated from what is known as nickel foam. This material is a three-dimensional matrix of fine nickel metal filaments or wires. The matrix is predominantly unfilled. FIG. 1 depicts a sheet 10 of foam material of a thickness 12 suitable for use as a current collector. Variations of this material have been developed for use as a substrate in rechargeable electrochemical cell electrodes. These foams are discussed in detail in U.S. Pat. No. 4,957,543 to Babjak et al. and U.S. Pat. No. 4,251,603 to Matsumoto el al.

Figure 2:
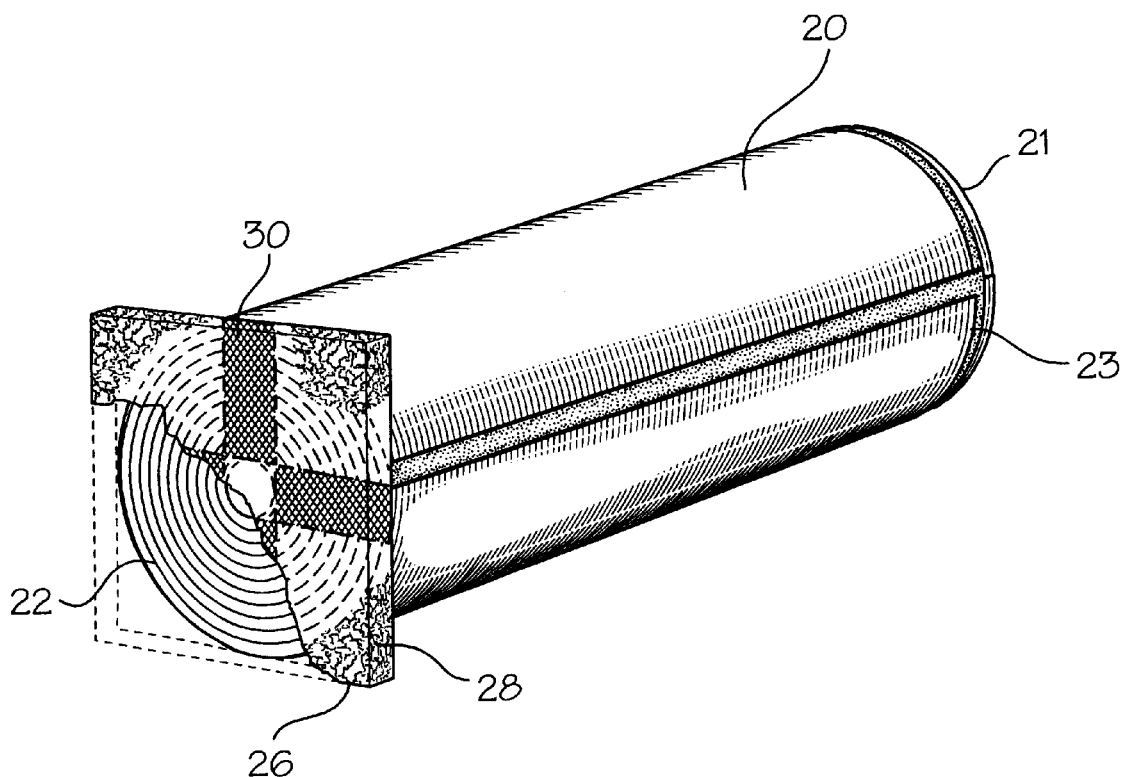
FIG. 2 depicts one embodiment of a foam collector secured to a jelly-roll assembly.
Figure 3A:
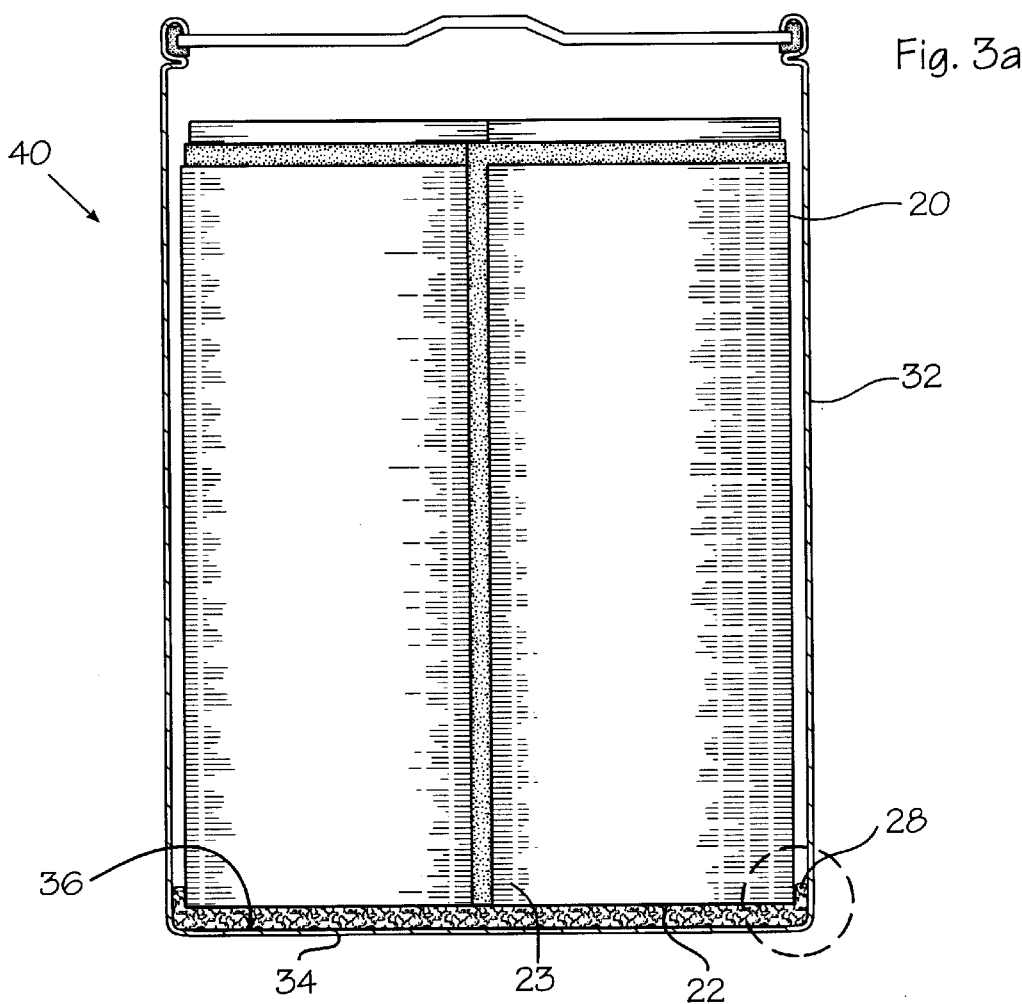
FIG. 3a is an internal view of a cell incorporating a foam collector.
Figure 3B:
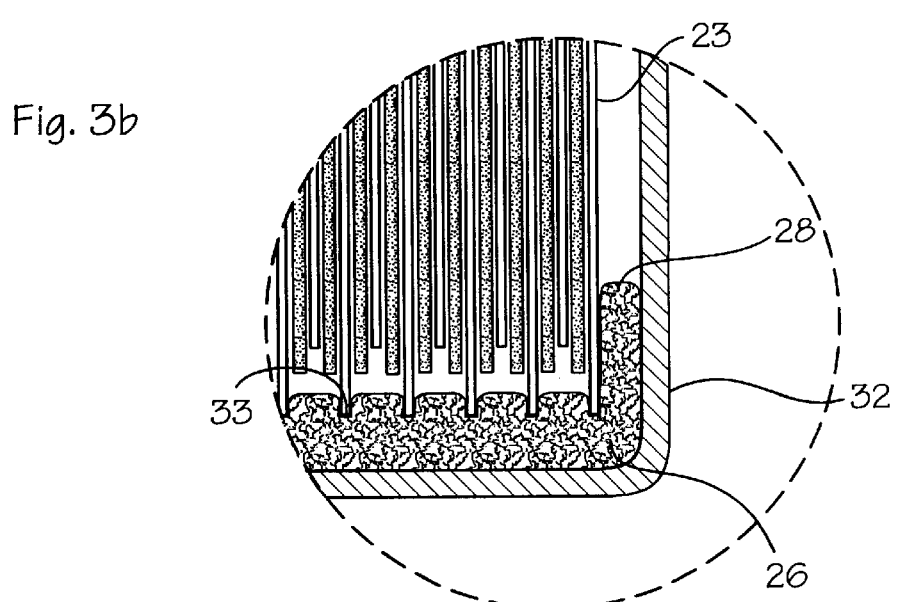
FIG. 3b is a cross sectional detail of the FIG. 3a embodiment showing the manner of connection between the foam collector and electrodes.
Figure 4:
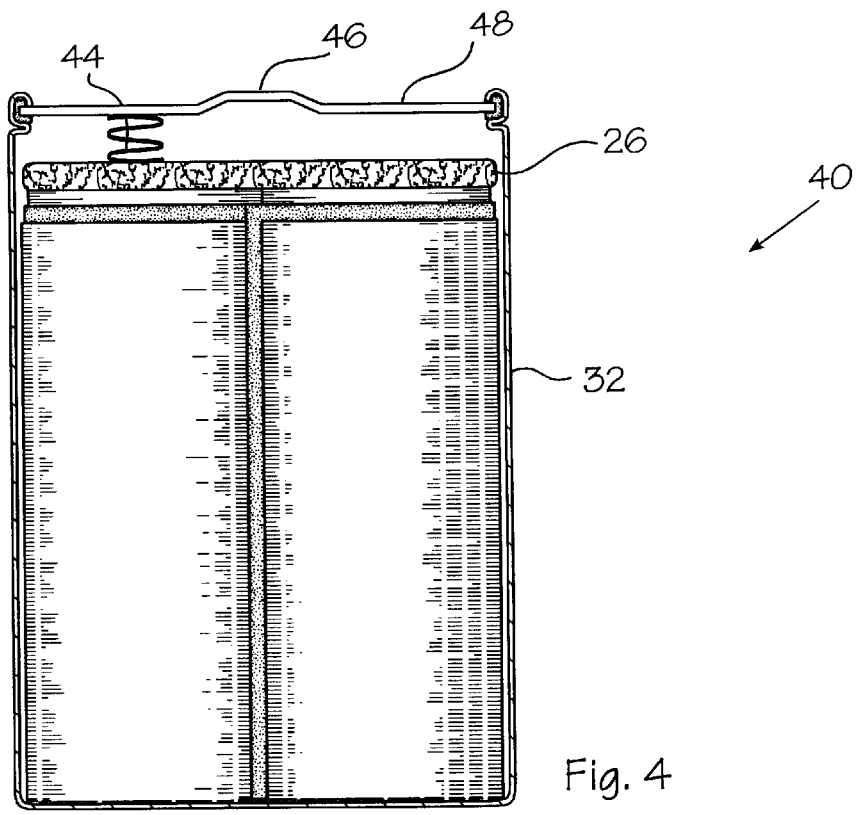
FIG. 4 is an internal view of a cell incorporating a foam collector fused to the positive electrode edges of a jelly-roll assembly.
Figure 5:
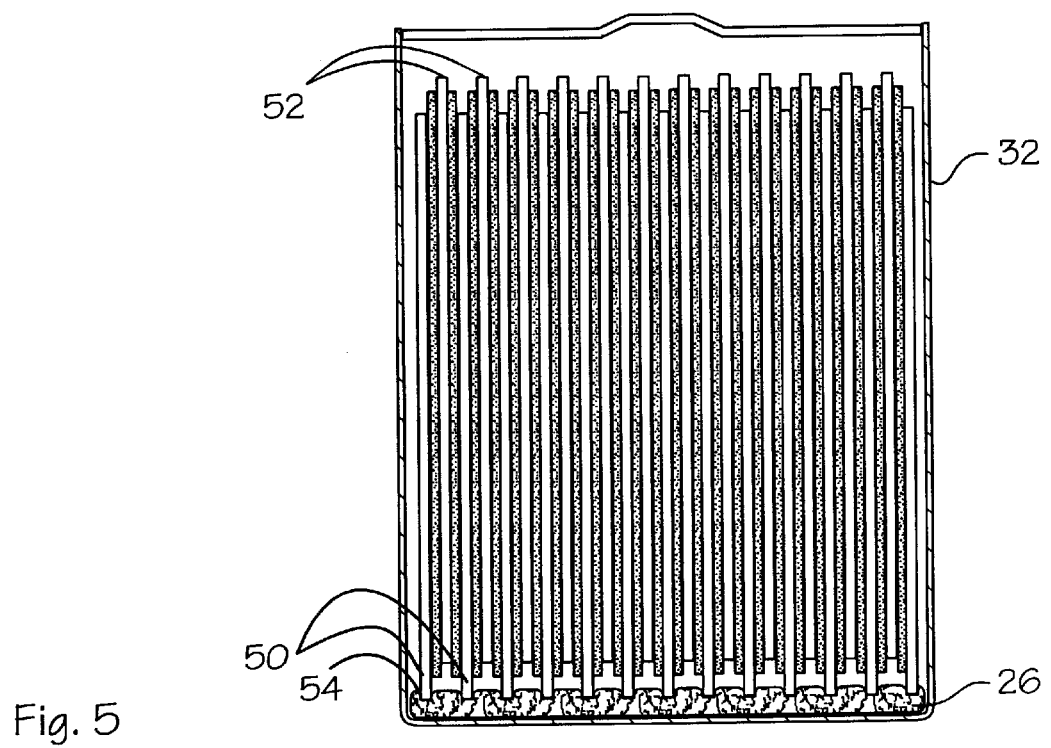
FIG. 5 is a cross sectional view depicting a foam collector in a prismatic cell.

FIG. 2 depicts a typical jelly-roll electrode assembly 20 with an attached current collector according to a preferred embodiment of the present invention. The jelly-roll assembly 20 is formed of two electrodes 21,23 offset axially and wound so that at each end of the assembly 20 an edge of a single electrode protrudes beyond the other electrode. The spiral edge 22 of one wound electrode 23 is exposed at one end of the assembly 20. A sheet of nickel foam material has been cut to form a square current collector 26 (a corner is cut away in the figure to reveal the spiral edge of the electrode). The collector 26 is preferably of a size and shape to cover the entire end of the assembly 20, providing contact with the entire spiral edge 22. Portions of the collector 26 extend beyond the spiral edge 22 to form four tabs or ear portions 28. The collector 26 is fused to the spiral edge 22 at fused portions 30 of the collector 26. This secures the collector 26 to the assembly 20 for ease of handling and assembly of the finished cell. Electrical continuity is also improved by fusing. The manner of fusing is described in more detail below. When the configuration of FIG. 2 is inserted into a cell container, as shown in FIG. 3a, the collector ear portions 28 are captured and compressed between the assembly 20 and the container 32. The assembly 20 is preferably pressed against the bottom 34 of the container forcing the collector 26 into further contact with the spiral edge 22. The diameters of the container 32 and assembly 20 must be sized to provide a radial gap for the compressed thickness of the ear portions 28. This configuration assumes that the container bottom 34 has a conductive surface 36 connected to a terminal of the cell 40. Because container 32 sidewalls are typically also conductive, the ear portions provide two functions. Due to the high compression of the ear portions 28, and consequent high contact forces against the container sidewalls, the ear portions 28 provide effective additional electrical contact area. As well, the high contact forces create increase frictional forces retaining the assembly 20 in place. This improves resistance to vibration and shock loads. The ear portions 28 may be enlarged or shaped to increase the contact area provided. The ear portions 28 may also take the form of a continuous portion about the perimeter of the collector 26 rather than multiple discrete portions. FIG. 3b is a cross sectional view of the electrode 23 in contact with the foam collector 26. The localized compression 33 of the foam collector 26 surface at each contact of the electrode 23 is shown. When the foam material has high porosity, the localized compression allows the foam material to penetrate between the successive winds of the spiral electrode 23 creating a more effective connection. This gap between successive winds in typical wound cells is about 0.030 to 0.050 inch (0.76 to 1.27 mm) wide. Foam nickel metal having a porosity of at least 90 percent by volume has been found to have the required characteristics. FIG. 4 presents an alternative cell configuration including a foam collector according to the present invention. A foam collector 26 is fused to the spiral edge of an electrode adjacent an open end of the cell 40 (typically the positive electrode). A conductive strap 44 connects the foam collector 26 with the terminal 46 of the cell cover 48 that closes the open end of the cell 40. In this configuration, the foam collector acts as a collector of current from the electrode but delivers this current to an intermediary circuit element, the strap 44, rather than the cell container 32. Although not as efficient and most likely having higher resistance than direct connection to the cell container, this configuration can be used at other locations. Particularly in alternative embodiments including a nonconductive cell container, an intermediate circuit element such as a strap may be employed to connect the collector to the appropriate terminal. Nickel foams can be formed with an integral solid nickel strap or a conductive strap may be welded to a foam collector. Note that in the embodiment of FIG. 4, the foam collector does not include ear portions. In FIG. 5, a foam collector 26 is positioned at the lower end of two sets of prismatic electrodes 50, 52. One set 50 of electrodes include end portions 54 protruding beyond and below the other set 52. The foam collector is compressed between these end portions 54 and the bottom of the cell container 32, forming a conductive bridge to a container terminal. The foam collector 26 provides effectively a multiple of electrical connections, independently from each electrode to the cell terminal. Optionally, a second foam collector may be similarly used with an intermediary circuit element to connect the second set 52 of electrodes at the top of the cell to a second cell terminal. In any configuration of a jelly-roll assembly, the electrode that is not to be connected to the collector must be offset sufficiently from the connected electrode that the foam material cannot be pushed up past the spiral edge to short against the nonconnected electrode.

To form a proper electrical connection against an electrode edge, the collector structure preferably is compressible and resilient enough to deform to the shape of the edge and then retain an expansive force to retain contact. The foam material used in the present invention allows sufficient local compression (FIG. 3b) to effectively connect to electrode edges having variations in shape and contour. In the prismatic cell of FIG. 5, the foam collector accommodates variations in the relative positioning of the individual electrodes. If the individual end portions 54 protrude varying distances from a common plane, the foam collector can still be made to contact each of them by inducing sufficient compression of the foam collector 26. Resiliency in the foam material is required to maintain a contact force against the circuit surfaces—both the electrodes and cell container or other circuit element. This is necessary to maintain effective contact in the case of shifting of the electrodes that may occur from vibration or shock. Fusing of the foam collector to either the electrodes or circuit element may reduce the need for these continuous contact forces. Even where the circuit surface to be contacted by the collector has no variation in shape, such as possibly the flat bottom of a cell container, the foam collector provides an improved electrical pressure contact connection. Because the foam collector is inherently pliable and compressible it will contact a larger area of even a flat surface. Rigid collectors of the prior art may suffer from hard points that hold the collector off from the contact surface. Because the present foam collector will follow the shape of flat or irregular surfaces and will not be held off by hard points, increased contact area and current carrying area results. Although the foam material need only be compressed sufficiently to maximize contact with the circuit surfaces, additional compression will increase the conductivity of the material.

Beyond the examples provided in the figures, the advantages of a foam collector will be beneficial wherever rigid circuit elements must be connected within a cell container. Particularly where a connection must be made upon assembly of a cell, the compressibility of the foam collector provides an effective and tolerant structure for completing a connection. Such a foam collector is contemplated in jelly-roll cells in standard and nonstandard configurations, prismatic cells, and other cell using electrodes formed on a sheet substrate.

A preferred material in making a foam collector according to the present invention has sufficient resiliency to provide an expansive force after compression. While nickel is a most preferred material, other materials may be used such as nickel plated copper. Although the structure of metal foam materials are typically described as an integral and interconnected matrix of wires or filaments, other similar structures provide the same benefits. A collector according to the present invention may also have a sponge-like structure having thin interconnected walls rather than wires. The relatively small cross-sectional dimensions of the solid elements and the porosity provide the compressibility that is needed in a foam collector. Non-integral structures, such as fiber mats have these properties but suffer from increased resistance and the potential for loose elements creating undesired internal electrical connections.

A benefit of the present invention is simplification of the cell assembly process. In a jelly-roll cell, the connection of the jelly-roll assembly 20 to the cell container 32 and terminals is generally a blind connection. That is, a current collector may be secured first to the jelly-roll assembly or the container before assembly. The second connection must be made blindly after the jelly-roll is inserted into the container. Because the connection is made blindly, the probability of an ineffective connection is relatively high. An electrochemical cell according to the present invention may be assembled in either of the above ways. Because the foam collector is able to accommodate variations in both the cell container and the jelly-roll assembly, a low resistance connection is easier to obtain in all cells. The foam collector may be used without permanent attachment to either the electrodes or cell container or may be connected to either or both. In one method of assembly, a foam collector is inserted loosely into the cell container and pressed to the bottom. The electrode assembly is inserted after the foam collector and pressed to the bottom of the cell container with sufficient force to partially compress the foam collector. In this method, the foam collector preferably does not include ear portions. Optionally, the foam collector may be first welded or otherwise connected to the cell container or other circuit elements prior to insertion of the electrode assembly. Alternatively, a foam collector (with or without ear portions) is secured to the electrodes prior to assembly. This may be accomplished by resistance welding or other means providing a conductive junction. The electrode assembly is then inserted into the container and pressed against the bottom to the desired compression. The foam collector may then be blind welded through the container bottom (or side wall to ear portions if used). An additional welding option is available with jelly-roll assemblies having a central axial hole or passage (such as resulting from use of winding mandrels). After the jelly-roll is inserted into the container, a welding electrode is inserted into the axial hole and pushed through the jelly-roll until contacting and compressing the foam collector. The foam collector is then welded to the container bottom. Variations of these methods applicable to other cell configurations and designs will be obvious to those skilled in the art.

EXAMPLE

In order to demonstrate the use of foam collectors and measure their performance, test cells were fabricated. The test cells were functional nickel-metal hydride Cs (sub C) cells. Square sections were cut from a nickel foam material. The material used was a product made available by Eltech Corporation of Chardon, Ohio; U.S.A. This particular foam is 92 to 94 percent porous and 0.050 inch (1.27 mm) thick. The foam filaments are approximately 160 microns in diameter and the foam structure contains about 80 pores per inch. The square sections were approximately 0.75 inch by 0.75 inch (19.0 by 19.0 mm) in size—just large enough to completely cover the end of the Cs configuration cell jelly-roll. One square section was resistance welded centered on the spiral end of the negative electrode of each jelly-roll. The welding was accomplished by compressing the foam collector to the spiral edge with a pair of rectangular contacts connected to a resistance welder. The welding current was made to pass between the separated contacts while passing through the negative electrode of the jelly-roll. A fusion joint was created at the intersection of the foam collector and the spiral edge. It was found that the transverse resistance of the foam collector—from contact to contact— was great enough to force a sufficient welding current through the foam/negative electrode interface to accomplish the weld. A resistance weld was formed at four locations in a cross pattern. Because the foam collector was square, somewhat triangular shaped ear portions of foam material extended beyond the edge of the spiral. The jelly-roll was inserted into a conductive cell container while forcing the ear portions back against the sides of the jelly-roll. The jelly-roll was then pushed into the container until bottoming against the container bottom. The jelly-roll was then further forced down until the foam collector was compressed to an approximate thickness of 0.020 inch (0.51 mm). The cell assembly was then completed. Sixteen test cells were fabricated in this manner. Eight standard production cells were used as controls. The control cells used a metallic spring collector welded to the container bottom before insertion of the jelly-roll. Effective internal resistance measurements were taken for all cells. The test cells and control cells were found to have the same average effective internal resistance. After testing, sample test cells were cut in half through the long axis to expose the assembled construction. It was observed that the foam collector had been locally compressed to partially penetrate the spacing between successive winds of the negative electrodes in the manner shown in FIG. 3b. This spacing was approximately 0.040 inch (1.0 mm)—the thickness of the positive electrode and two separators. An obvious advantage of the foam collector in this test was the reduced profile of the foam collector. At a compressed thickness of 0.020 inch (0.51 mm), the foam collector provided a 1.3 percent additional total effective internal volume over the previously used spring collector that had an assembled height of 0.040 inch (1.02 mm). Additionally, because of the relative simplicity of the foam collector construction, the per cell parts cost was significantly less than the fabricated spring, despite the relatively high cost of nickel foam on a per pound basis.

Generally when a current collector of the prior art is to be welded to the spiral edge of an electrode assembly, the spiral edge must first be cleaned of active material. During electrode fabrication active material is typically deposited over the entire surface of an electrode substrate. If any welding to the electrode is to be accomplished after deposition, a portion of the electrode must be cleaned to expose the substrate metal and provide a weld surface. When welding a collector to a spiral electrode, an area of the substrate immediately adjacent the substrate edge must first be cleaned of active material to fully expose the edge for welding. This is because rigid collectors are unable to contact the thin spiral edge over sufficient area to form an effective welded connection. However, it has been found that electrode edges need not be cleaned if the collector to be welded consists of a high porosity foam. Due to the compression of the foam, a great number of filaments are forced into contact with the edges of the electrode. This provides sufficient weld area to create an effective weld between the foam collector and electrode. In the above example, the electrodes edges were not cleaned or bared prior to welding.

The low resistance of the foam collector is particularly advantageous with cells designed for high drain rates—such as the nickel-metal hydride cell used in the test above. Because resistance generates greater losses at high currents, low resistance is more critical for performance of high drain rate electrochemical cells. The foam collector provides a device that can more easily and cheaply guarantee low resistance in high drain rate cells. These benefits are particularly important in the environment of high volume commercial production existing in the industry at this date. Other embodiments of the present invention, using present and future materials, and in the context of other electrochemical cells will be obvious to those skilled in the art. The examples provided above are only in way of demonstrating the novel aspects of the invention. The scope of the invention is intended to be defined by the following claims.

What is claimed is:

1. An electrochemical cell having reduced internal resistance comprising:
   at least one wound sheet electrode having a spiral edge and having successive winds spaced apart to form a gap;
   a second electrode;
   a canister, the at least one sheet electrode and the second electrode being disposed within the canister;
   a first and second terminal, the second terminal being functionally connected to the second electrode;
   a current collector, the current collector comprising high porosity foam metal, the current collector being in contact with the spiral edge and residing partially within the gap;
   the current collector being electrically connected to the first terminal.

2. An electrochemical cell according to claim 1, wherein:
   the at least one wound electrode comprises at least one wound negative electrode; and the second electrode comprises at least one wound positive electrode;

and the at least one negative electrode and at least one positive electrode form a jelly-roll assembly.

3. An electrochemical cell according to claim 2, wherein:

the current collector is captured between the spiral edge and the canister and is in electrical contact with the canister.

4. An electrochemical cell according to claim 3, wherein:

the canister has an end and a side wall;

the current collector has at least one ear portion; and the current collector is captured between the spiral edge and the canister end and the at least one ear portion is compressed between the jelly-roll assembly and the canister side wall.

5. An electrochemical cell according to claim 4, wherein:

the current collector is in contact with substantially the entire spiral edge; and the at least one ear portion extend beyond the spiral edge.

6. An electrochemical cell according to claim 5, wherein:

the at least one ear portion is welded to the canister side wall.

7. An electrochemical cell according to claim 1, wherein:

the at least one wound electrode comprises at least one wound positive electrode; and the second electrode comprises at least one wound negative electrode;

the at least one negative electrode and at least one positive electrode form a jelly-roll assembly; and the cell further comprising a circuit element connecting the current collector to the first terminal.

8. An electrochemical cell according to claim 7, wherein:

the negative wound electrode has a spiral edge having successive winds spaced apart to form a second gap;

the canister has an end; and the cell further comprising:

a negative current collector comprising high porosity foam metal, the negative current collector being compressed between the canister end and the negative electrode spiral edge and the negative current collector residing partially within the second gap.

* * * * *